(12) United States Patent
LeBlanc et al.

(10) Patent No.: US 7,422,370 B2
(45) Date of Patent: Sep. 9, 2008

(54) HYDRAULIC COMPENSATION FOR MAGNETICALLY BIASED FLUID DYNAMIC BEARING MOTOR

(75) Inventors: Jeffry Arnold LeBlanc, Aptos, CA (US); Troy Michael Herndon, San Jose, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 277 days.

(21) Appl. No.: 10/602,471

(22) Filed: Jun. 23, 2003

(65) Prior Publication Data
US 2004/0027018 A1 Feb. 12, 2004

Related U.S. Application Data

(60) Provisional application No. 60/401,797, filed on Aug. 6, 2002.

(51) Int. Cl.
*F16C 32/06* (2006.01)
(52) U.S. Cl. .................... 384/107; 384/114; 384/121
(58) Field of Classification Search ................ 384/100, 384/114, 115, 118, 120
See application file for complete search history.

(56) References Cited

U.S. PATENT DOCUMENTS

| | | | |
|---|---|---|---|
| 3,934,950 A | | 1/1976 | Kuhlmann |
| 4,795,275 A | | 1/1989 | Titcomb et al. |
| 4,797,009 A | * | 1/1989 | Yamazaki ................. 384/100 |
| 4,918,678 A | | 4/1990 | Dolby |
| 4,998,033 A | | 3/1991 | Hisabe et al. |
| 5,046,863 A | * | 9/1991 | Sakatani et al. ............ 384/101 |
| 5,524,985 A | | 6/1996 | Dunfield |
| 5,715,116 A | * | 2/1998 | Moritan et al. ........... 360/99.08 |
| 5,988,887 A | * | 11/1999 | Lee .......................... 384/107 |
| 6,191,510 B1 | | 2/2001 | Landin et al. |
| 2001/0022869 A1 | * | 9/2001 | Tanaka et al. .............. 384/100 |

* cited by examiner

*Primary Examiner*—Richard W L Ridley
*Assistant Examiner*—Justin Krause
(74) *Attorney, Agent, or Firm*—Novak Druce + Quigg LLP

(57) ABSTRACT

A fluid dynamic bearing motor including a stationary sleeve, a rotating shaft axially disposed through the sleeve, a journal gap between the shaft and the sleeve, the gap defined by first and second interfacial surfaces of the shaft and sleeve, at least one set of fluid dynamic grooves formed on the first interfacial surface of the journal gap, and at least one step defined on the second interfacial surface of the journal gap.

29 Claims, 6 Drawing Sheets

HYDRAULIC COMPENSATION FOR MAGNETICALLY BIASED FLUID DYNAMIC BEARING MOTOR

CROSS REFERENCE TO RELATED APPLICATIONS

This application claims the priority of U.S. Provisional Application No. 60/401,797, filed Aug. 6, 2002 by LeBlanc et al. (entitled "Hydraulic Compensation For Magnetic Bias FDB Motor"), which is herein incorporated by reference.

FIELD OF THE INVENTION

The invention generally relates to fluid dynamic bearing motors and, more particularly, to magnetically biased fluid dynamic bearing motors.

BACKGROUND OF THE INVENTION

Disk drives are capable of storing large amounts of digital data in a relatively small area. Disk drives store information on one or more recording media, which conventionally take the form of circular storage disks (e.g. media) having a plurality of concentric circular recording tracks. A typical disk drive has one or more disks for storing information. This information is written to and read from the disks using read/write heads mounted on actuator arms that are moved from track to track across the surfaces of the disks by an actuator mechanism.

Generally, the disks are mounted on a spindle that is turned by a spindle motor to pass the surfaces of the disks under the read/write heads. The spindle motor generally includes a shaft mounted on a base plate and a hub, to which the spindle is attached, having a sleeve into which the shaft is inserted. Permanent magnets attached to the hub interact with a stator winding on the base plate to rotate the hub relative to the shaft. In order to facilitate rotation, one or more bearings are usually disposed between the hub and the shaft.

Over the years, storage density has tended to increase, and the size of the storage system has tended to decrease. This trend has lead to greater precision and lower tolerance in the manufacturing and operating of magnetic storage disks.

From the foregoing discussion, it can be seen that the bearing assembly that supports the storage disk is of critical importance. One bearing design is a fluid dynamic bearing. In a fluid dynamic bearing, a lubricating fluid such as air or liquid provides a bearing surface between a fixed member of the housing and a rotating member of the disk hub. In addition to air, typical lubricants include gas, oil, or other fluids. The relatively rotating members may comprise bearing surfaces such as cones or spheres, or may alternately comprise fluid dynamic grooves formed on the members themselves. Fluid dynamic bearings spread the bearing surface over a large surface area, as opposed to a ball bearing assembly, which comprises a series of point interfaces. This bearing surface distribution is desirable because the increased bearing surface reduces wobble or run-out between the rotating and fixed members. Further, the use of fluid in the interface area imparts damping effects to the bearing, which helps to reduce non-repeat run-out. Thus, fluid dynamic bearings are an advantageous bearing system.

Many current fluid dynamic bearing designs employ a combination of journal and thrust bearings. Frequently, these designs include a shaft journal bearing design having a thrust plate at an end thereof. The journal bearings typically include two grooved surfaces facing the journal (either on the shaft or on the sleeve), the thrust plate bearings typically include two grooved surfaces, one facing each of the gaps defined by the thrust plate and sleeve, and by the thrust plate and counter plate. Net hydraulic pressure created by the journal bearings establishes a thrust force on the end of the shaft (i.e., toward the thrust plate bearings) that displaces the shaft axially; an opposing force, generated, for example, by a magnetic bias force, is needed to stabilize the motor.

However, as the temperature fluctuates in the motor, the viscosity of the fluid in the bearings changes as well. While the magnetic bias force remains constant regardless of temperature, the hydraulic pressure (thrust force) generated by the journal bearings varies with the changing fluid viscosity. Thus, the opposing forces (thrust force vs. magnetic bias force) may not be of sufficient magnitudes to offset each other, allowing the rotor to move axially as temperature changes.

Therefore, a need exists for a magnetically biased fluid dynamic bearing design that can compensate for changing temperature and fluid viscosity in the motor.

SUMMARY OF THE INVENTION

A fluid dynamic bearing motor comprising a stationary sleeve, a rotating shaft axially disposed through the sleeve, a journal gap between the shaft and the sleeve, said gap defined by first and second interfacial surfaces of the shaft and sleeve, at least one set of fluid dynamic grooves formed on the first interfacial surface of the journal gap, and at least one step defined on the second interfacial surface of the journal gap.

BRIEF DESCRIPTION OF THE DRAWINGS

So that the manner in which the above recited embodiments of the invention are attained and can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures.

DETAILED DESCRIPTION

Figure 1:
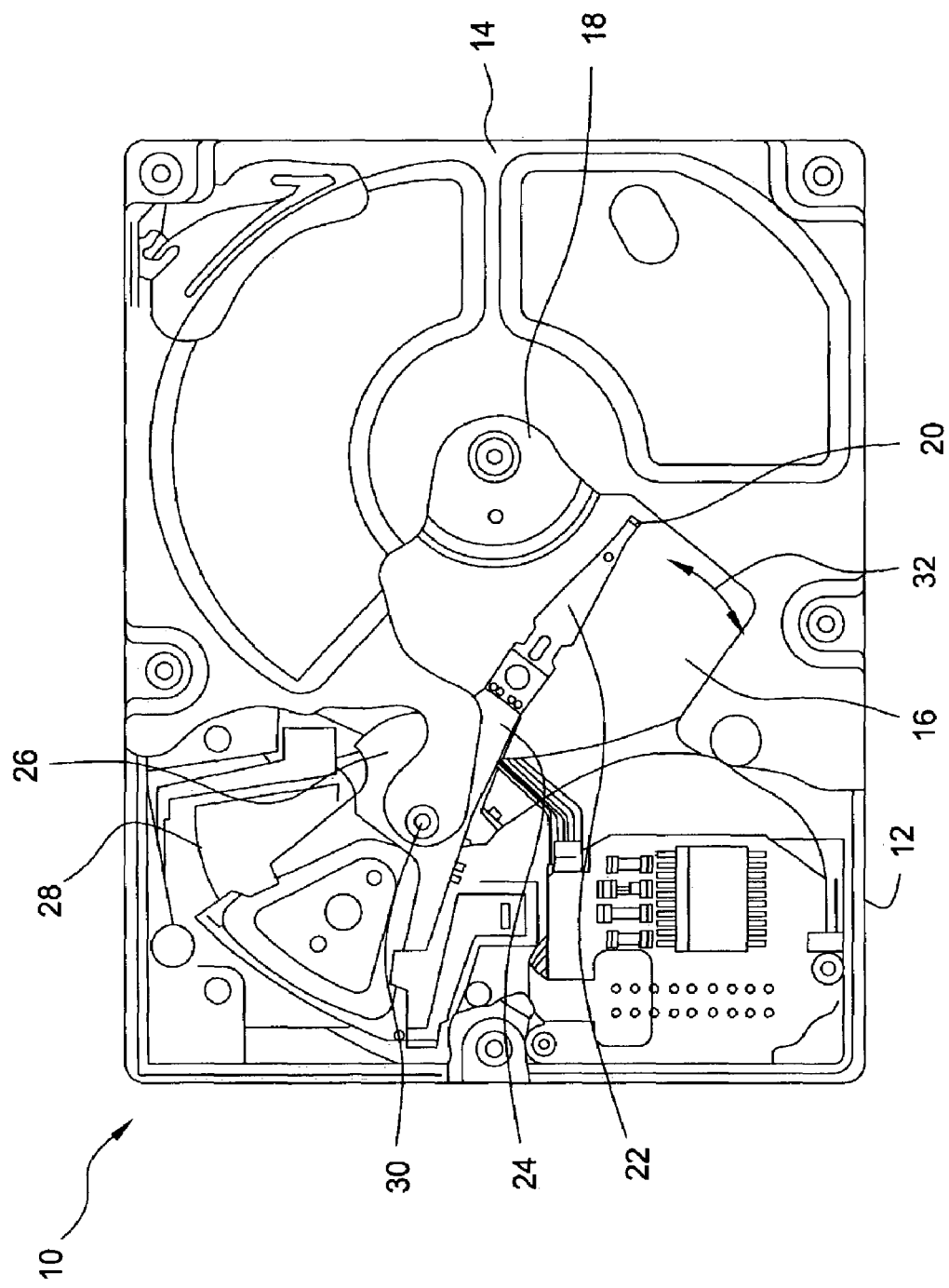
FIG. 1 depicts a plan view of one embodiment of a disk drive that comprises a motor in which the invention is used.

FIG. 1 depicts a plan view of one embodiment of a disk drive 10 for use with embodiments of the invention. Referring to FIG. 1, the disk drive 10 includes a housing base 12 and a top cover plate 14. The housing base 12 is combined with cover plate 14 to form a sealed environment to protect the internal components from contamination by elements outside the sealed environment. The base and cover plate arrangement shown in FIG. 1 is well known in the industry; however, other arrangements of the housing components have frequently been used, and aspects of the invention are not limited by the particular configuration of the disk drive housing.

Disk drive 10 further includes a disk pack 16 that is mounted on a hub 202 (see FIG. 2) for rotation on a spindle motor (not shown) by a disk clamp 18. Disk pack 16 includes one or more of individual disks that are mounted for co-rotation about a central axis. Each disk surface has an associated read/write head 20 that is mounted to the disk drive 10 for communicating with the disk surface. In the example shown in FIG. 1, read/write heads 20 are supported by flexures 22 that are in turn attached to head mounting arms 24 of an actuator 26. The actuator shown in FIG. 1 is of the type known as a rotary moving coil actuator and includes a voice coil motor (VCM), shown generally at 28. Voice coil motor 28 rotates actuator 26 with its attached read/write heads 20 about a pivot shaft 30 to position read/write heads 20 over a desired data track along a path 32.

Figure 2:
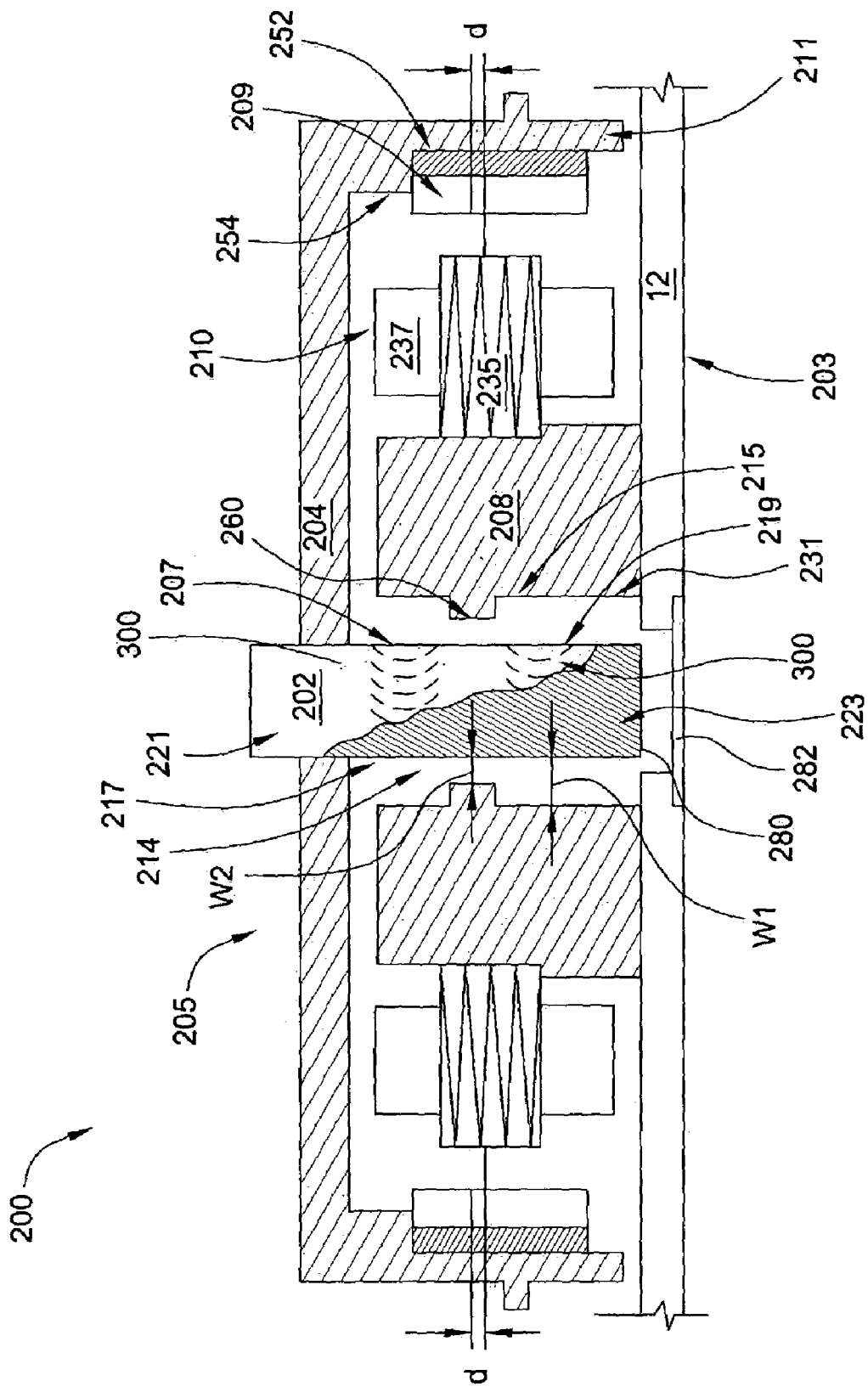
FIG. 2 depicts a side sectional view of a magnetically biased fluid dynamic bearing motor according to a first embodiment of the invention.
Figure 2B:
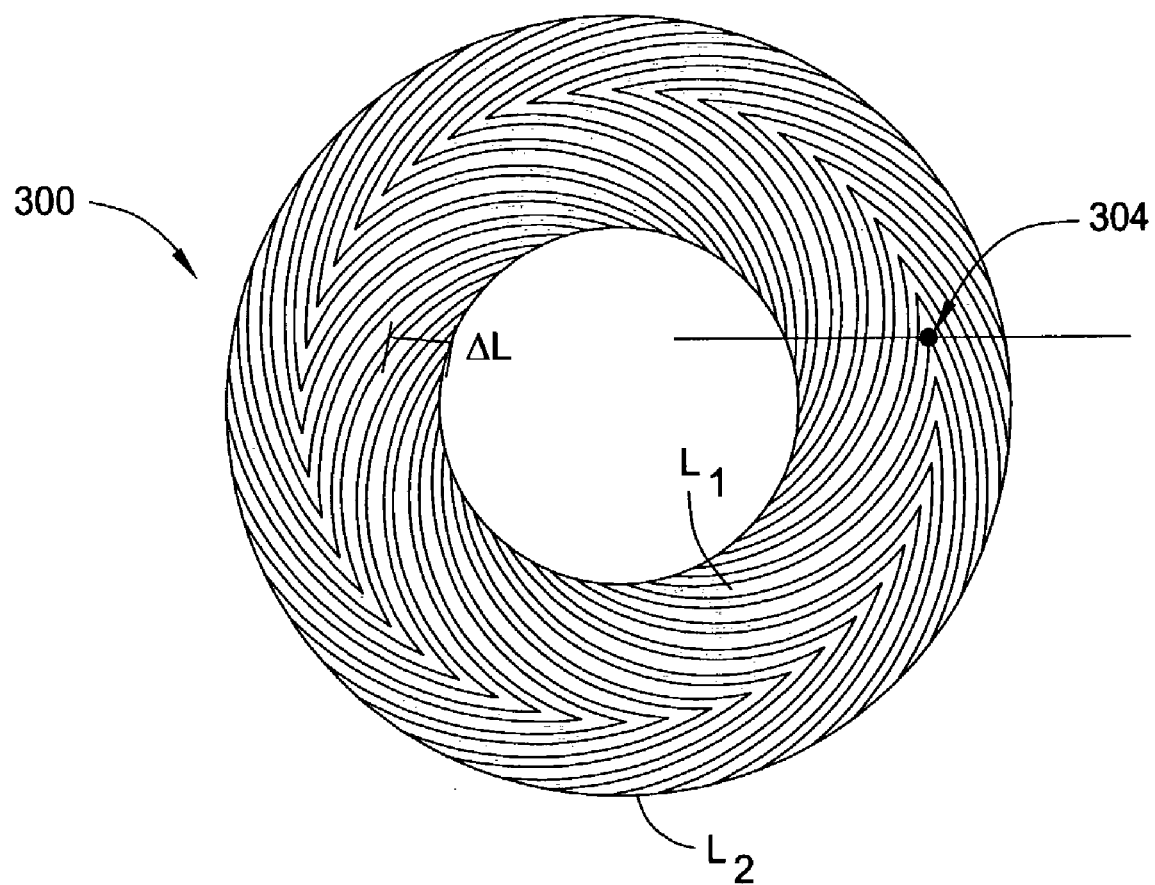
FIG. 2B depicts a groove pattern in accordance with the present invention.

FIG. 2 is a sectional side view of a fluid dynamic bearing motor 200 according to one embodiment of the present invention. The motor 200 comprises a rotating assembly 205, a stationary assembly 203, and a bearing assembly 207

The rotating assembly 205 comprises a shaft 202 affixed at a first end 221 to a hub 204 that supports at least one disk (not shown) for rotation. A second end 223 of the shaft 202 is distal from the first end 221. The hub 204 additionally supports a magnet assembly 252 comprising a back iron 211 with a magnet 209 affixed thereon. In one embodiment of the invention, the magnet assembly 252 is positioned on the inside circumferential surface 254 of the hub 204.

The stationary assembly 203 comprises a sleeve 208 mounted on the base 12. The sleeve 208 further comprises a bore 231 through which the shaft 202 is disposed axially. A stator 210 mounted on the base 12 cooperates with the magnet 209 in the hub 204 to induce rotation of the shaft 202 and hub 204 relative to the sleeve 208. The stator 210 comprises a plurality of "teeth" 235 formed of a magnetic material such as steel, where each of the teeth 235 is wound with a winding or wire 237.

The bearing assembly 207 is formed in a journal (or gap) 217 defined between the facing surfaces of the inner diameter 215 of the sleeve 208 and the outer diameter 219 of the shaft 202. A fluid 214 such as air, oil or gas is disposed between the shaft 202 and the sleeve 208. The journal 217 further comprises fluid dynamic grooves 300; an example is formed on one or both of the interfacial surfaces 215, 219 (in FIG. 2, the fluid dynamic grooves 300 are formed on the outer surface 219 of the shaft 202).

The fluid dynamic grooves 300 form a circumferential ring around an interfacial journal surface 215, 219 and may comprise a V-shaped pattern or a chevron, spiral or sinusoidal pattern or other pattern (not shown). The pattern, generates a pressure distribution across the bearing surface that provides improved bearing rocking stiffness.

The fluid dynamic grooves 300 may be formed asymmetrically, where the length of one leg of the pattern leading to the pattern's pressure apex is greater than the length of the leg on the other side of the pattern's apex. When asymmetry of the pattern is created by legs with different lengths, a net flow of fluid 214 is pumped toward the leg with the shorter length. As the hub 204 and shaft 202 rotate, a net hydraulic pressure is generated by the journal bearing grooves 300 toward the second end 223 of the shaft 202. Pressure is also generated as a function of the size of the gap between the shaft 202 and sleeve 208 in the areas of the grooves 300 (and depending on the size of the gap, symmetric grooves 300 may also be used, and the same effect achieved). This pressure exerts a positive thrust force on the second end 223 of the shaft 202 that displaces the shaft 202 axially.

One way to balance the asymmetry pressure acting on the shaft 202 is to offset the magnet 209 and stator 210 relative to each other to create a magnetic bias force that biases the hub 204 downward and stabilizes the motor 200. As illustrated in FIG. 2, the center lines of the magnet 209 and stator 210 are separate by a vertical distance of d. This method has generally proven to be effective; however, temperature changes in the motor may limit or hinder the ability of the magnetic force to bias the hub 204. This is because the viscosity of the fluid 214 varies with changes in temperature, which means that the journal asymmetry pressure is not constant, but rather may be a function of temperature. Therefore, because the magnetic force can not be varied accordingly to address and counter the changes in journal asymmetry pressure, temperature variations will cause the shaft 202 and hub 204 to move axially.

One solution to this problem would be to use the axial shaft displacement to change the length of the asymmetry created by the journal bearings 300. However, the axial displacement required to effectively counter the pressure changes would likely be too great to be practically incorporated. In the embodiment illustrated in FIG. 2, journal asymmetry pressure fluctuations are countered by changing the gap width between the shaft 202 and sleeve 208 in the asymmetric portions of the journal bearings 300A. This is accomplished by creating a step 260 on the journal surface 215, 219 that is opposite the asymmetric grooves 300. In FIG. 2, the step 260 is located on the inner diameter 215 of the sleeve 208, opposite the journal bearing grooves 300 on the shaft 202. The step 260 is also offset axially from the grooves 300, so that when the motor 200 is at rest, the gap separating the grooved portion of the shaft 202 from the sleeve 208 is a standard width $w_i$. Although there is a small axial overlap of the step and grooves, the apex 304 of the grooves 300 is generally adjacent a gap of standard width $w_1$. Thus, as the shaft 202 moves downward, the grooves 300 move closer axially to the step 260, and the width of the gap separating the upper portion of the grooved area (i.e., mostly the upper leg of the groove pattern) of the shaft 202 from the sleeve 208 shrinks to a gap $w_2$ As the gap in this region tightens, more pressure is built up at the bottom of the shaft 202, and the pressure pushes the shaft back up. Furthermore, this design provides additional stiffness (pressure change vs. axial movement of shaft) to the motor, reducing or eliminating the need for either a thrust plate with grooves or for a tight thrust gap, which draws constant power.

Typical fluid dynamic bearing motors have journal bearing gaps on the order of five microns or less, and changes to the gap must be controlled to a fraction of that number. Therefore, processes used to create the steps 260 and must be very precise. Steps 260 may be created either by removing material from the shaft 202 or sleeve 208 (e.g., by processes including, but not limited to, turning, grinding, electrochemical machining, or electrical discharge machining), or by adding material to the surfaces 202, 208 (e.g., by processes including, but not limited to, plating, coating, or sputtering). For example, Diamond Like Coating (DLC) may be sputtered onto the appropriate area.

Figure 3:
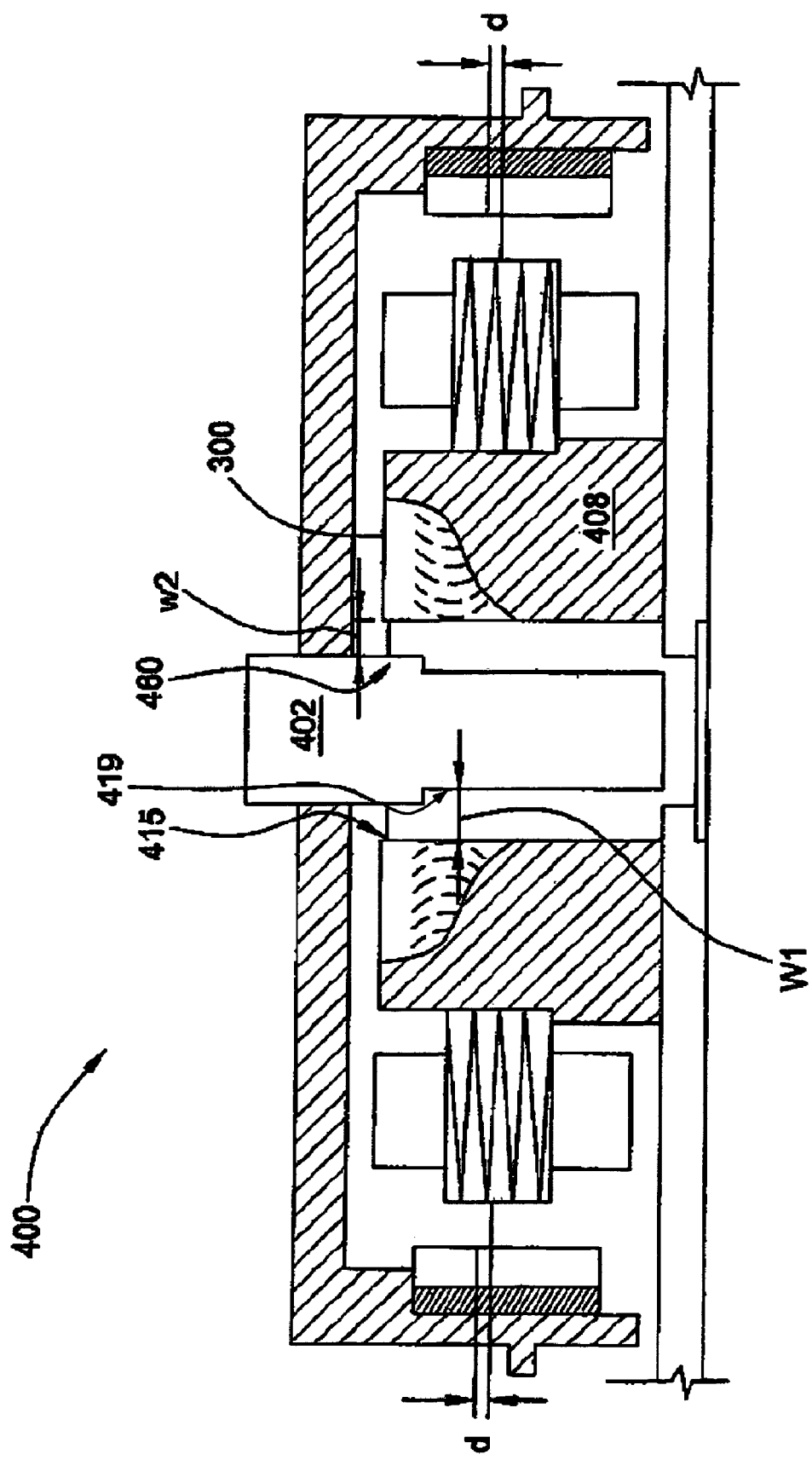
FIG. 3 depicts a side sectional view of a magnetically biased fluid dynamic bearing motor according to a second embodiment of the invention.

FIG. 3 illustrates a second embodiment of the present invention. The motor 400 is configured similarly to the motor 200 in FIG. 2. However, in FIG. 3, the step 460 is formed on the outer diameter 419 of the shaft 402, rather than on the inner diameter 415 of the sleeve 408. The step 460 operates in the same manner as the step 260 in FIG. 2, to narrow the bearing gap and thus counter hydraulic pressure variations.

Figure 4:
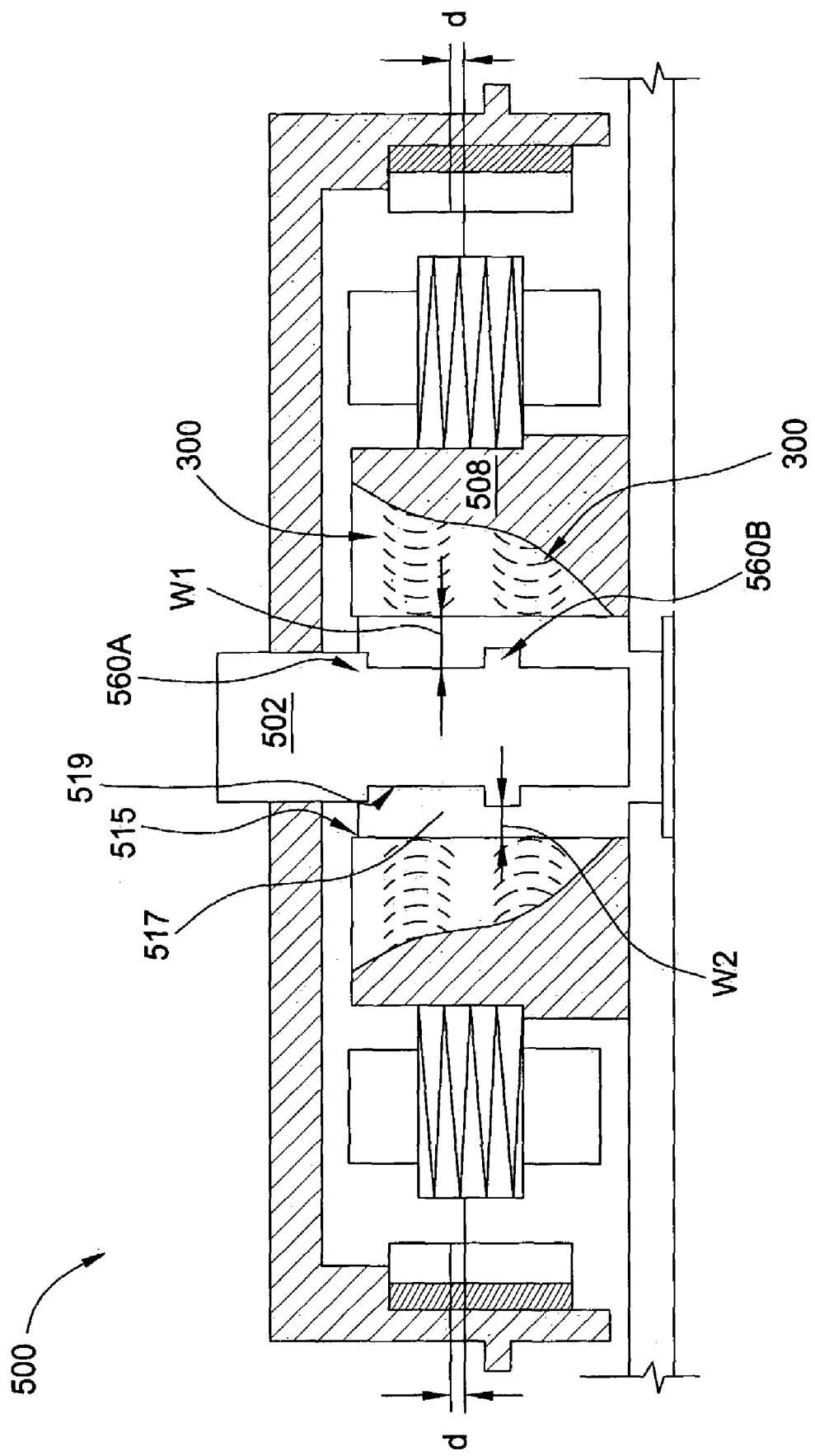
FIG. 4 depicts a side sectional view of a magnetically biased fluid dynamic bearing motor according to a third embodiment of the invention.

A third embodiment of the invention is illustrated in FIG. 4. The motor 500 is similar to the motors 200 and 400 illustrated in FIGS. 2 and 3. However, the journal 517 comprises two steps 560A, 560B located across the journal from each set of asymmetry grooves 300. Although the steps 560A, 560B are depicted as formed on the outer diameter 519 of the shaft 502, it will be appreciated that the steps 560A, 560B may also be formed on the inner diameter 515 of the sleeve 508, as the step 260 is located in FIG. 2.

Figure 5:
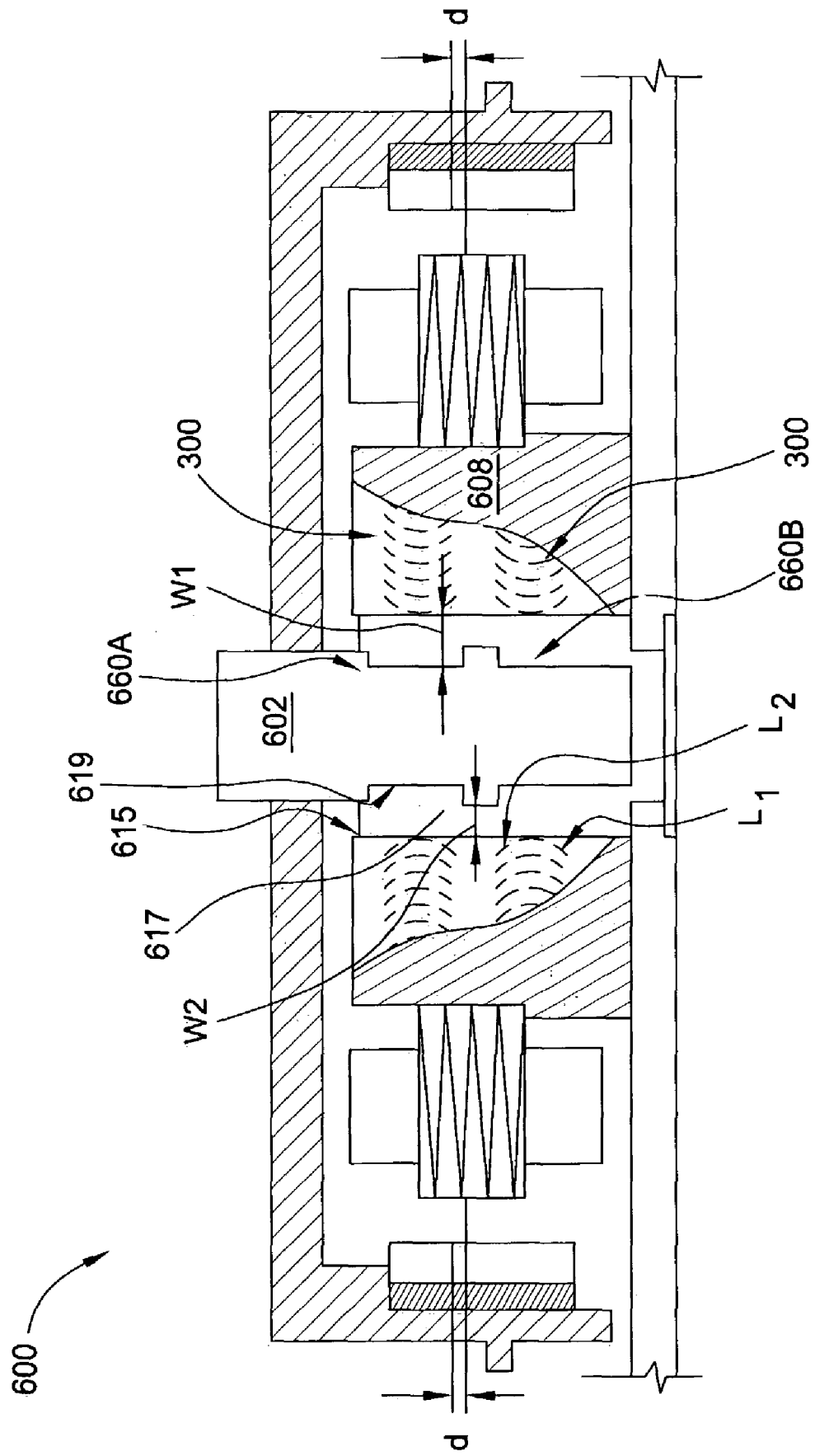
FIG. 5 depicts a side sectional view of a magnetically biased fluid dynamic bearing motor according to a fourth embodiment of the invention.

FIG. 5 illustrates a fourth embodiment of the invention. The motor 600 is similar to the motor 500 in FIG. 4 and uses the same principle of a double step. However, the journal steps 660A, 660B are made larger than in the previous embodiments so that they interact with larger areas of the bearing grooves 300. The grooves 300 comprise two legs: $L_1$ that pumps upward toward the apex, and $L_2$ that pumps downward toward the apex. When the motor 600 is at rest, a majority of each set of grooves 300 is adjacent a gap of standard width $w_1$, while the edges of the grooves are just bordered by a narrower gap $w_2$ created by the steps 660A, 660B. However, as the shaft 602 moves downward axially, the gap narrows over a larger portion of the grooves 300, and narrows completely over the upper legs $L_2$, to a width of $w_2$. The narrower gap over the upper legs $L_2$ takes away the downward pumping of these legs, and also diminishes the upward pumping of the lower legs $L_1$. Thus each individual set of bearing grooves 300 is affected to a larger degree over both legs $L_1$, $L_2$, unlike the previous embodiments that affected the gaps adjacent smaller portions of the bearing grooves, and more particularly narrowed the gaps mostly adjacent the upper legs of the grooves.

Thus the present invention represents a significant advancement in the filed of fluid dynamic bearing motor design. A magnetically biased fluid dynamic bearing motor is provided in which axial movement of the shaft and hub is limited despite temperature-induced pressure fluctuations in the journal. The design also provides improved stiffness to the motor, reducing or eliminating the need for thrust plate bearing grooves or tight thrust gaps. In addition to the thermal compensation effects, the motor doesn't need a thrust bearing as the thrust is created by the journal asymmetry. This asymmetry is created by asymmetric bearing grooves in the journal bearing (as described above) and/or by the proper location of the step or steps 260 relative to the groove pattern in the journal bearing. Positioning of the step or steps 260 alters the pressure profile in the journal bearing and thus the pressure on the bottom of the shaft to support the shaft for rotation over the base. In other words, when the reduced gap width provided by the step 260 is over the grooves, the effect is asymmetry whether or not the groove pattern itself being asymmetric. Also, either the end surface of the shaft (e.g. 280, FIG. 2) or the facing surface of the base 12 or counterplate 282 may be grooved to provide a quicker take-off when the motor shaft 202 spins up. The groove pattern would typically be designed to pump toward the center of the shaft. However, even in this instance the thrust stiffness is primarily created by journal bearing asymmetry, established in whole or in part by the step facing the journal groove pattern.

While the foregoing is directed to embodiments of the invention, other and further embodiments of the invention may be devised without departing from the basic scope thereof, and the scope thereof is determined by the claims that follow.

What is claimed is:

1. A fluid dynamic bearing system comprising:
    a stationary sleeve;
    a rotating shaft axially disposed through the sleeve;
    a journal gap between the shaft and sleeve, said gap defined by first and second interfacial surfaces between the shaft and sleeve;
    at least one set of fluid dynamic grooves formed on the first interfacial surface of the journal gap; and
    at least one step defined on the second interfacial surface of the journal gap and extending in a non-axial direction, wherein the at least one step reduces the journal gap in a localized region, and wherein the sleeve and shaft are operable to move axially relative to each other during operation by, at least in part, hydraulic force generated by interaction of the at least one set of fluid dynamic grooves and the step with a fluid disposed in the gap, such that the at least one step moves away from an apex of the at least one set of fluid dynamic groove;
    such that the hydraulic force maintains the stationary sleeve and the rotating shaft in a substantially fixed relative axial position with respect to each other during operation despite viscosity changes in the fluid which would otherwise cause the stationary sleeve and the rotating shaft to move from the substantially fixed axial position.

2. The fluid dynamic bearing system according to claim 1, wherein the fluid dynamic grooves are asymmetric to establish pumping pressure toward an end of the shaft.

3. The fluid dynamic bearing system according to claim 1, wherein the at least one step comprises a circumferential raised surface on the second interfacial surface.

4. The fluid dynamic bearing system according to claim 3, wherein the at least one step is opposite and offset axially from the at least one set of fluid dynamic grooves.

5. The fluid dynamic bearing system according to claim 4, wherein the first interfacial surface of the gap comprises an outer diameter of the shaft, and the second interfacial surface comprises an inner diameter of the sleeve.

6. The fluid dynamic bearing motor according to claim 5, wherein the outer diameter of the shaft further comprises two sets of fluid dynamic grooves and the inner diameter of the sleeve further comprises two steps, each of the steps being defined, at least in part, across from one of the sets of grooves.

7. The fluid dynamic bearing motor according to claim 1, wherein the outer diameter of the shaft further comprises two sets of fluid dynamic grooves and the inner diameter of the sleeve further comprises one step located across from one of the two sets of grooves.

8. The fluid dynamic bearing motor according to claim 1, wherein the first interfacial surface of the gap comprises an inner diameter of the sleeve and the second interfacial surface comprises an outer diameter of the shaft.

9. The fluid dynamic bearing motor according to claim 8, wherein the inner diameter of the sleeve further comprises two sets of fluid dynamic grooves and the outer diameter of the shaft further comprises the at least one step.

10. The fluid dynamic bearing motor according to claim 8, wherein the inner diameter of the sleeve further comprises two sets of fluid dynamic grooves and the outer surface of the shaft further comprises the at least one step.

11. The fluid dynamic bearing system of claim 1 wherein the at least one step has a first edge in the non-axial direction.

12. The fluid dynamic bearing system of claim 11 wherein the at least one step has a second edge in an axial direction.

13. The fluid dynamic bearing system of claim 12 wherein the non-axial direction is approximately perpendicular to the axial direction.

14. The fluid dynamic bearing system of claim 1 further comprising:
a base having a base surface facing an end surface of the rotating shaft and separated therefrom during operation.

15. The fluid dynamic bearing system of claim 14 wherein the base includes a counterplate and the base surface is a surface on the counterplate.

16. The fluid dynamic bearing system of claim 14 such that during operation the at least one set of fluid dynamic grooves generates hydraulic pressure in the fluid between the base surface and the rotating shaft to exert a thrust force on the end of the rotating shaft to at least partially effect the axial movement of the stationary sleeve and the rotating shaft relative to each other.

17. A fluid dynamic bearing motor comprising:
a stationary sleeve;
a shaft and hub rotatable in relation to the sleeve;
a gap defined between the sleeve and the shaft;
a fluid bearing means between the sleeve and the shaft; and
a pressure regulating means cooperating with and opposing the fluid bearing means across the gap therefrom to generate axial hydraulic force by interaction with a fluid disposed between the fluid bearing means and the pressure regulating means to maintain proper axial alignment of the shaft and hub with the sleeve, wherein the shaft and the stationary sleeve are operable to move relative to each other in response to the hydraulic force such that the pressure regulating means moves axially during operation away from an apex of the fluid bearing means such that the hydraulic force maintains the stationary sleeve and the rotating shaft in a substantially fixed relative axial position with respect to each other during operation despite viscosity changes in the fluid, wherein the viscosity changes would otherwise cause the stationary sleeve and the rotating shaft to move from the substantially fixed relative axial position.

18. The fluid dynamic bearing motor according to claim 17, wherein the fluid bearing means comprises at least one set of fluid dynamic grooves formed on a first surface defining the gap.

19. The fluid dynamic bearing motor according to claim 18, wherein the pressure regulating means comprises at least one step formed on a second surface defining the gap.

20. The fluid dynamic bearing motor of claim 19 wherein the at least one step extends from the second surface in a non-axial direction.

21. The fluid dynamic bearing motor of claim 20 wherein the at least one step has a first edge in the non-axial direction.

22. The fluid dynamic bearing motor of claim 21 wherein the at least one step has a second edge in an axial direction.

23. The fluid dynamic bearing motor of claim 22 wherein the non-axial direction is approximately perpendicular to the axial direction.

24. The fluid dynamic bearing motor of claim 19 wherein the shaft and the stationary sleeve define a width of the gap and the at least one step narrows the width in a localized region of the at least one step wherein the width is measured in a non-axial direction perpendicular to an axial direction.

25. A fluid dynamic bearing as claimed in claim 18 wherein the fluid bearing means includes two sets of grooves on the first surface of the gap, and the pressure regulating means comprises step defined on a second surface of the gap at least partly across from each of the sets of grooves.

26. A fluid dynamic bearing as claimed in claim 25 wherein at least one of the two sets of grooves is asymmetric to establish a pressure profile toward a base of the motor.

27. The fluid dynamic bearing motor of claim 17 further comprising:
a base having a base surface facing an end of the shaft and separated therefrom during operation.

28. The fluid dynamic bearing motor of claim 27 wherein the base surface faces an end surface of the shaft.

29. The fluid dynamic bearing motor of claim 28 wherein the base includes a counterplate and the base surface is a surface on the counterplate.

* * * * *